March 30, 1971   P. D. GRIEM, JR   3,573,017
METHOD AND APPARATUS FOR MELTING AND SUPPLYING
HEAT-SOFTENABLE MATERIALS IN A PROCESS
Filed Nov. 4, 1968                    4 Sheets-Sheet 1

INVENTOR.
PAUL D. GRIEM, JR.
BY
Staelin + Overman
ATTORNEYS

United States Patent Office 3,573,017
Patented Mar. 30, 1971

3,573,017
METHOD AND APPARATUS FOR MELTING AND SUPPLYING HEAT-SOFTENABLE MATERIALS IN A PROCESS
Paul D. Griem, Jr., Newark, Ohio, assignor to Owens-Corning Fiberglas Corporation
Filed Nov. 4, 1968, Ser. No. 773,070
Int. Cl. C03b 37/00
U.S. Cl. 65—2
20 Claims

ABSTRACT OF THE DISCLOSURE

A preferred embodiment of the invention illustrates novel apparatus for carrying out a method for producing glass fibers including feeding glass batch to a furnace for melting into a pool, flowing molten glass from the pool into a feeder means and attenuating streams from the feeder into fibers. Fuel flow to furnace burners is regulated in response to deviations of actual furnace temperatures from a preselected setpoint temperature. Fuel flow requirement changes are anticipated by monitoring the rate of batch feed to the furnace and modifying the fuel flow setpoint or the furnace setpoint temperature in response to batch feed rate changes. To provide more control the temperature of the molten glass exiting from the pool is sensed to further modify the fuel flow setpoint or the furnace setpoint temperature in accordance with glass flow rates through the system as indicated by temperature changes in exiting glass.

In the manufacture of mineral fibers and especially those formed of glass which are collected and processed to form mats or like constructions particularly usable for heat and sound insulation or kindred purposes, streams of molten glass flowing from a supply are acted upon or engaged by blasts of stream or compressed air or other gases to draw or attenuate the streams to fibers. The formed fibers are usually collected or accumulated upon a moving foraminous conveyor to a thickness to form mats of desired dimensions and characteristics for particular purposes.

Much progress has been made in the development of more sophisticated instrumentation in the measuring and controlling of many of the variables in fiber making, especially in temperature, fuel and air flow, pressures, molten material levels, etc. However, the feedback of information from these variables has not been adequate in the area of maintaining optimum rates of flow of material through the system and thus maximum production rates. Further, feedback of information cannot anticipate changes in control variables which may be required.

Accordingly, it is an object of this invention to provide an improved method and apparatus for achieving automatic control of a fiber-forming system in which requirements for change are anticipated to maintain maximum operating efficiency and a maximum product quality.

It is a still further object of this invention to provide an improved method and apparatus for continuously melting heat-softenable materials for use in a process such as glass fiber-forming in which one or more variables are interpreted as a measure of the total glass flow through the furnace and the apparatus and process controlled accordingly.

The above objects are carried out by a preferred embodiment of the invention disclosed herein which illustrates apparatus for producing glass fibers featuring a furnace for melting glass batch to form a molten pool of glass, feeder means for receiving molten glass from the pool and issuing streams of molten glass from orifices formed therein, and means for attenuating the streams into fibers. Burner means supply heat in the furnace. The actual temperature in the furnace is sensed and a signal is generated proportional thereto. A setpoint signal may be generated which is proportional to a desired operating temperature for the furnace. The actual and setpoint temperatures are compared and fuel flow to the burners is regulated in response to a difference in the signals. Means are disclosed for feeding glass batch to the furnace. The rate of feed of the batch to the furnace is sensed and a signal is generated in proportion thereto. Means are utilized for combining the batch rate feed signal with the actual and setpoint temperature signals to further regulate the fuel flow to the burner means. Advantageously the level of the molten pool is sensed and a signal is generated proportional thereto to control the batch feeding means. The batch feed rate signal may be directly taken from or derived from the level control signal.

The actual temperature sensing means of the furnace may include means for sensing the crown temperature of the furnace and/or means for sensing the temperature of the molten pool in the furnace.

Means are provided for heating the feeder means. The amount of heat supplied to the feeder means may be made responsive to the batch feed rate signal. As noted above, the level sensing signal derived from the molten pool may be utilized to control the batch feeding means and to also control the feeder means or bushing temperatures to insure a maximum flow rate through the system.

Other objects, advantages and features of this invention will become apparent when the following description is taken in conjunction with the accompanying drawings, in which.

A preferred arrangement for carrying out the method of the invention has been illustrated in connection with apparatus for producing blown fibers from mineral fiber-forming materials, but it is to be understood that the incorporation and use of the invention is contemplated with other methods and arrangements for producing fibers from heat-softenable materials wherever the same may be found to have utility.

The invention has been found to have particular adaptability with apparatus for producing blown fibers of glass sometimes referred to as glass wool, wherein blasts of steam or other gas are directed into an engagement with streams of molten glass in a direction to draw out or attenuate streams to fiber form by the velocity of the blasts. The fibers formed by this method are usable for many purposes: for forming mats for heat and sound insulation, both in bonded and unbonded forms; roofing materials; filter packs; protective coverings; and other kindred uses.

Figure 1:
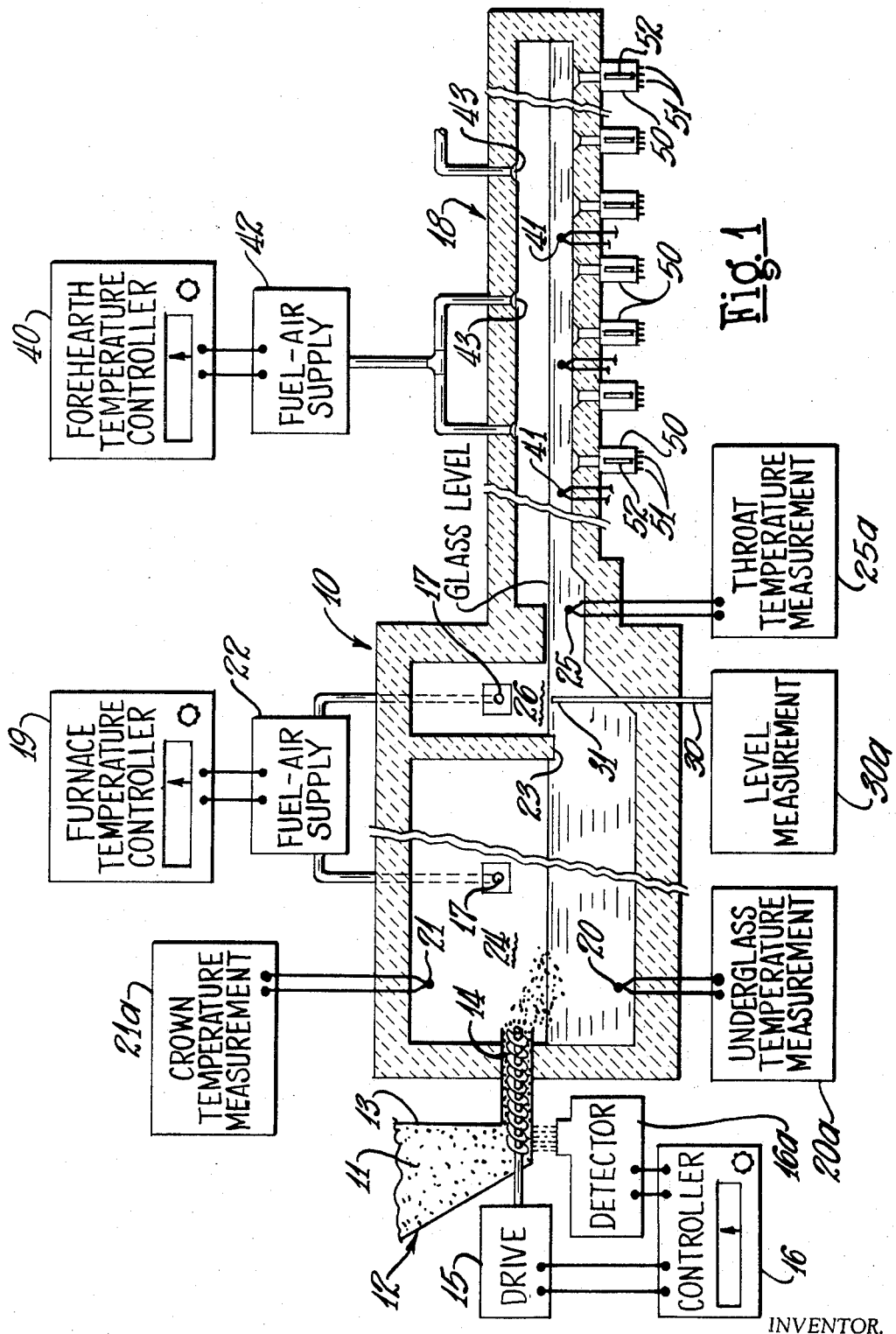
FIG. 1 is a semi-diagrammatic elevational view of apparatus for carrying out the teachings of this invention.

In FIG. 1 there is illustrated a furnace 10 constructed of refractory material which is adapted to receive glass batch or cullet 11 through a material delivery or batch charging means generally indicated at 12. The material supplying means 12 may comprise a hopper 13 having a conveyor means 14 associated therewith to deliver the batch from the hopper to the furnace. The conveyor 14 may be of the auger type shown or of an endless belt variety. A drive means 15 is shown for driving the conveyor while a drive controller 16 may be utilized to set the speed of the conveyor drive to control the rate in which batch or cullet is fed to the furnace 10.

The furnace 10 may be fired by a plurality of fuel gas or oil burners 17 to a temperature rendering the glass batch or collet molten and flowable. The raw, unmelted batch material or cullet is introduced at the left side (as viewed in FIG. 1) or rear end of an elongated furnace 10, the material in molten condition flowing forwardly or generally lengthwise with the furnace, and is mixed and fined as it flows through the furnace to and through a forehearth 18.

The melting and processing temperatures within the furnace may be controlled by a fuel flow regulator 19. The regulator 19 may be responsive to thermocouple means 20 beneath the surface of the molten glass which provides a signal to an under glass temperature measurement means 20a for use by regulator 19. In addition to, or as an alternative to, crown temperature thermocouple means 21 mounted in the upper portion of the melting chamber of the furnace 10 supplies a signal to a crown temperature measurement means 21a which then provides a signal available for use by the regulator 19. Further, a throat thermocouple 25 and measurement means 25a supplies a signal which is available for use by regulator 19. In response to one or more temperature sensing means as described, the fuel flow regulator 19 provides signals to a fuel-air supply means 22 to maintain a desired melting and refining temperature in the interior of the furnace 10.

It should be noted that the fuel flow regulator, fuel-air supply, and burner combination is an illustration of any of a number of means and methods for supplying and controlling the B.t.u. input or heat energy input to the furnace to supply the heat required for the furnace. This invention thus applies to furnaces which are heated by electricity or other means.

A skimmer partition 23 may be built into the furnace to divide the furnace 10 into a melting chamber 24 and a molten pool chamber 26. While not necessary for the operation of this invention the use of a skimmer partition 23 is advantageous in that it may block the flow of floating and unmelted batch or cullet 11, and that it may dampen and shield the disruptive effects of batch addition and melting in chamber 24 from the chamber 26 in which the level of the molten pool of glass may be sensed by a level measurement means 30.

The level measurement means 30 may be any of several suitable types, such as a probe member which utilizes the electro-conductive properties of molten glass and in which the probe member and the melt are parts of the circuit which measure the level of the molten pool. In this embodiment there is illustrated a probe 31 which is utilized as a pneumatic indicator which operates when the probe member has its open end covered by the molten material defining the level so as to create a back pressure within the member or probe 31. Different levels or heads of molten material above the opening in the probe member 31 provide different pressures within the level measurement means 30 which may be converted to electrical signals which are proportional to the level of the molten pool within chamber 26 specifically, or within the furnace 10 generally. Since such devices are well known to those skilled in the art a more detailed explanation will not be undertaken here.

The glass or other molten material in the forehearth 18 may be delivered from the forehearth to one or more feeder means or bushings 50, each bushing being provided with one or a plurality of openings or orifices (see FIG. 2) formed in projecting tips 51 for flowing glass streams adapted to form primary filaments of bodies which are delivered to an attenuating means 60. As noted hereinbefore the attenuating means attenuate streams issuing from an orifice or orifices by gaseous blasts to form fibers in a known manner for deposition upon a collecting surface 61, which may be a foraminous conveyor, to form a mat or for other uses.

As noted hereinbefore with respect to the furnace 10, temperatures in the forehearth 18 may be maintained by a forehearth temperature controller 40 which is responsive to one or more thermocouples or other heat sensing means 41 located within the forehearth to supply a signal to a fuel-air supply controller means 42 which delivers a combustible mixture to burners 43.

Figure 2:
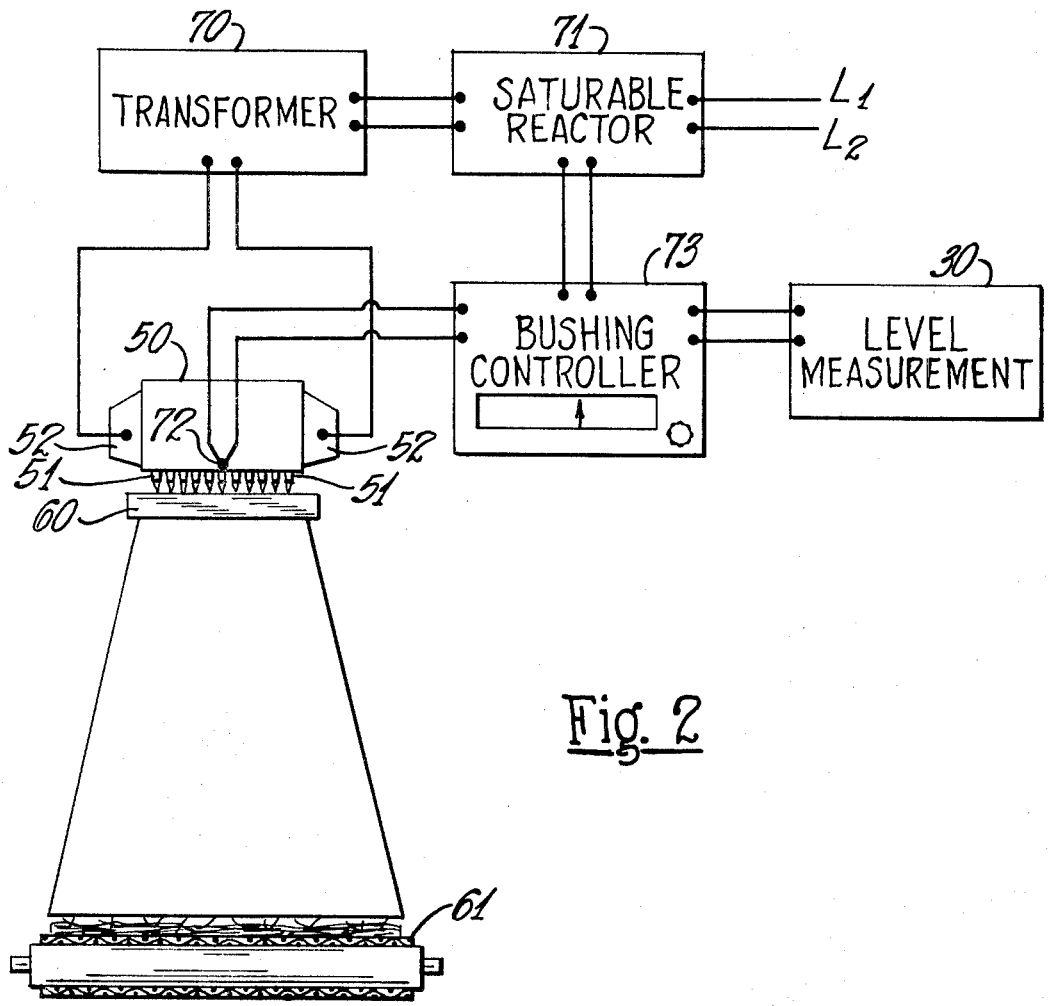
FIG. 2 is a schematic and diagrammatic illustration of an arrangement for controlling the production of fibers in the apparatus illustrated in FIG. 1.

Referring to FIG. 2 it may be seen that the heating current for an individual bushing of the plurality of feeder means 50 may be alternating current supplied over a main power supply line by way of conductors L1 and L2. The power source, for example, may be a 440 volt, 60 cycle source (not shown). The alternating current is supplied to the feeder through a transformer 70 to terminals 52 connected to the bushing 50. The transformer 70 reduces the voltage, for example, to a value in the order of 2 volts, which; since feeder 50 is made of low-resistance high-temperature metal such as platinum; is capable of providing heating current in the order of one or more kilo-amperes. The primary loop of the power circuit for the bushing 50 may contain a power regulator or controller such as a saturable core reactor 71 which acts as a variable impedance to permit adjustment of the current flow through the feeder for the temperature desired. Other suitable regulators such as silicon controlled rectifiers may be used. The saturable core reactor is cooperatively associated with one or more thermocouples 72 attached to the feeder 50 to sense and generate an electrical signal corresponding or proportional to the actual feeder temperature.

The thermocouple 72 may be connected to an amplifier contained in controller 73 which amplifies the temperature signal supplied from a thermocouple to the controller 73. The controller 73 may be manually set by an operator to a predetermined setpoint temperature which is based upon past history and experience in operating similar systems to provide a setpoint temperature which is believed to be desirable or within a desired range. The controller 73 may generate a signal proportional to the desired setpoint temperature for forwarding to the saturable reactors 71 or to be algebraically combined with the actual feeder temperature from thermocouple 72 and/or the signal from the level measurement means 30.

The signal from the level measurement means 30 may advantageously be utilized to modify the setpoint in the controller 73, to provide a new setpoint directly as a result of the direct measurement of the level, or to modify the effect of a previously selected setpoint.

The controller 73 may include a regulator directly affected by the combination of the signals hereinbefore discussed to supply direct current to the saturable reactor 71 or other control device to modify the impedance offered by the reactor in the primary feeder power circuit to provide automatically a desired feeder temperature. When the temperature of the feeder tends to rise above the setpoint as modified by the level measurement means 30, the direct current supplied from the controller 73 to the saturable core reactor 71 is reduced, thereby enlarging the impedance offered by the reactor 71 and diminishing the current flow in the secondary or feeder loop connected to the terminals 52. If the temperature of the feeder tends to drop below the modified setpoint, the controller may act to supply additional direct current to the reactor 71, thereby reducing the reactor impedance and increasing the current flow in the secondary or feeder loop for a rise in temperature in the feeder 50. The feeder in this embodiment may thus be maintained at a temperature which is determined by a preselected setpoint as modified to an operating setpoint by the level measurement means 30.

Thus, in the system disclosed herein, continuous and automatic control of glass flow rate may be achieved.

As pointed out above, glass flow rate is adjustable by the "valve" action of the bushing temperature. By the addition of means for precisely metering the flow of batch into the furnace there is provided a system capable of throughput control. As shown in the drawing and described hereinbefore continuous glass level information is available. Therefore, for a given batch input rate, glass flow out must be equal or a change in level will be indicated. This indication, then, may be used for control of the bushing temperature to maintain equilibrium between input and output.

A batch input control may be accomplished in a number of ways. As shown in FIG. 1 a detector 16a, which may be a gamma ray source and detector, monitors mass flow of material via a conveyor. The drive controller 16 may be manually set by an operator to provide a desired input, furnishing a control signal to conveyor drive 15. The drive controller 16 is responsive to signals received from the detector 16a to maintain the batch input at a predetermined constant rate, if a constant input and output system is desired.

While a constant input-output system is desirable for certain applications the invention herein is applicable with other methods of operation and batch charge control, e.g. operation of the batch charge control from its own fixed or variable setpoint.

Figure 3:
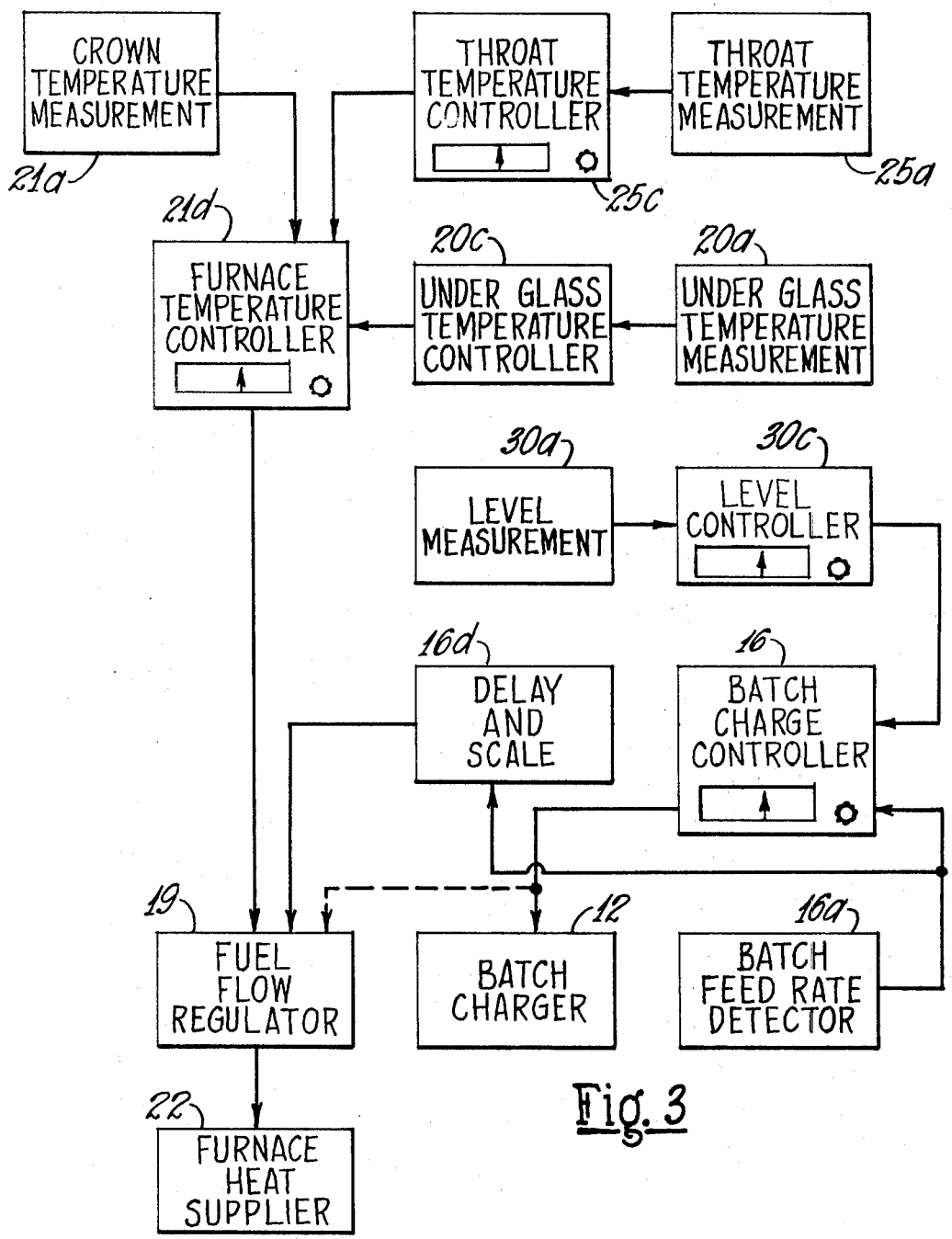
FIG. 3 is a diagrammatic layout of a schematic for controlling the apparatus of FIG. 1.

As noted in FIG. 3 the level measurement means 30a may provide a signal which may be compared with a level setpoint signal in a level controller unit 30c. The output from level controller unit 30c may be provided as an input to batch charger controller 16 so that a sufficient feed rate is maintained via controller 16 and the batch charger generally indicated at 12 to maintain the level at a desired point. The batch charge of feed rate detector 16a monitors the batch actually being fed via the conveyor means 14 of charger 12 to insure that the feed rate called for by the controller 16 is being properly met. If a deviation occurs the batch charger controller 16 is regulated by the feedback signal from the batch charge detector 16a to maintain the rate called for by the level controller 30c.

Since the batch charger controller 16 may receive its setpoint signal from level controller 30c, the signal provided from the controller 30c may be a measure of, proportional to, or an indication of the total glass flow through the furnace. The level controller signal from circuit 30c may thus be utilized to modify other control variables as will be described hereinafter.

As noted hereinbefore the batch charger controller 16 may be manually set at a preselected setpoint to deliver a specified feed rate of glass batch to the furnace 10. If this method of operation is utilized the controls as discussed hereinafter are still applicable.

By using the level signal or a signal from the glass level control loop as a measure of the total glass flow through the furnace the heat requirements of the furnace may be anticipated. The heat requirements of the furnace may also be anticipated by using the signal from or deriving a signal from the batch charger controller 16, or, as shown, from the batch feed rate detector 16a.

In past systems, heat supplied to the furnace has been controlled by a regulator 19 by one or both of the following methods. A signal proportional to the actual crown temperature may be generated by measurement means 21a and compared with a crown temperature setpoint which is proportional to a desired crown temperature in a crown temperature signal controller circuit 21c. A deviation between the actual and setpoint temperatures modified the output of a fuel-air supply or furnace heat supply means designated generally at 22.

Alternatively, or in addition to the above, an under glass temperature measurement means 20a may be utilized to generate a signal proportional to the under glass temperature which was compared to a signal generated by an under glass setpoint circuit which is proportional to a desired under glass temperature in an under glass controller circuit 20c. The output from the controller circuit 20c was forwarded to the furnace temperature regulator 19 for modification of its regulatory effects on the fuel-air means 22.

In the past the crown temperature and under glass temperatures were measured and utilized as control variables. However, they have been used strictly in the feedback sense. Therefore, a change in flow rate of glass through the furnace or system was reflected by a change in heat supplied to the furnace, but only after a relatively long response time. If the batch feed rate as indicated by the output of the glass level control loop from 30c or as indicated by the signal from the batch feed rate detector 16a is utilized, the change in fuel flow energy, or B.t.u. requirements may be anticipated before the requirements are registered by either crown temperature or under glass temperature measurement.

In FIG. 3 the output from the level control circuit may be fed to the regulator 19 as a signal which anticipates a requirement for a change in furnace temperature since either more batch or less batch is being fed to the inlet of the furnace in response to a signal derived from the glass level control loop.

In the schematic of FIG. 3 the output of the batch feed rate detector 16a is used as a measure of the glass flow through the system and as a measure of input to the system. Thus, this signal may be utilized to anticipate the fuel flow or heating requirements of the furnace and be used to modify the control being effected by regulator 19.

It is desirable to utilize a delay and scale unit 16d which will delay the application of a change in batch feed rate per the signal from charge controller 16 until the change in feed rate results in an actual change in batch fed to or conditions in the furnace. The unit 16d may, in addition to or as an alternative to delaying application of the feed rate signal to regulator 19, effect a scaling of the batch feed rate signal to reflect the actual amount of batch increase or decrease to the furnace as the batch feed rate signal increases or decreases.

If the output of the glass level control loop or the monitoring of the batch charging rate is not as precise as may be desired, either because of the instrumentation or in response time, a further control effect may be combined therewith to provide a very fine or close control for the system as follows.

Referring to FIG. 1 there is illustrated a thermocouple 25 located in the throat or exit of the furance 10 wherein glass from the pool in the furnace is exiting to the forehearth 18 for the formation of fibers in bushings 50. The thermocouple 25 provides a signal to throat temperature measurement circuit 25a which is a further measure of glass flow in the system. The temperature of the molten glass in the throat, outlet or exit of the furnace 10 responds more quickly to temperature changes caused by a change in flow from the melting tank 10 to the forehearth 18 and the feeders associated therewith because of a reduced total thermal environment. When the output through the system is slowed down, the flow of new hot glass through the throat outlet is reduced. The under glass temperature as sensed by the throat thermocouple 25, therefore, gradually reduces. Conversely, when the output is speeded up from the system the flow of new hot glass through the fluid outlet is increased. The under glass temperature as sensed by the throat thermocouple will then also increase.

Accordingly, referring again to FIG. 3, the output of the throat temperature measurement circuit 25a may be a signal which is proportional to the temperature measured and may be compared with a throat temperature setpoint signal which is proportional to a desired throat temperature setpoint in the throat temperature controller 25c. A deviation from the throat temperature setpoint for a desired glass flow thus results in an output signal from controller 25c which may be fed to furance temperature controller 21d to be combined algebraically with the other signals received by a furnace temperature controller 21d or to modify the operating temperature setpoint in the controller 21d.

It can thus be seen that the output from the glass level control circuit or the batch charger feed rate may be utilized to anticipate an increase or a decrease in glass flow through the system which would require a corresponding increase or decrease in heat supplied via the heating or burner means 17 in the furnace 10. Adjustments in the "anticipating" measurement are effected by the throat temperature measurement, the crown temperature measurement, and/or the under glass temperature measurement.

In a manner similar to the throat and crown thermocouples, the under glass thermocouple 20 and its associated measurement circuit 20a generates a signal proportional to the temperature of the molten glass in furnace 10, which may be compared to a setpoint in controller 20c. A deviation from the setpoint in unit 20c produces a signal which may be utilized by the furnace temperature controller 21d to control the fuel flow regulator 19.

The output from the controller 21d provides a setpoint for the fuel flow or heat supply regulator 19. The regulator 19 provides an output signal to the fuel-air supply or furnace heat supplier 22. The output signal from regulator 19 is changed or modified in accordance with the signal received from batch charge controller 16 via the delay and scale unit 16d, which is an anticipation of the change in heat requarements for the furnace 10. The signals from controller 21d and unit 16d may advantageously be combined in an algebraic combining circuit prior to or in regulator 19 to effect the modification desired.

It should be noted that an "anticipating" signal of this same nature may be obtained from the batch charge controller 16, and the connection or application of this detection signal is noted by the dotted line lead connection between unit 16 and regulator 19.

Figure 4:
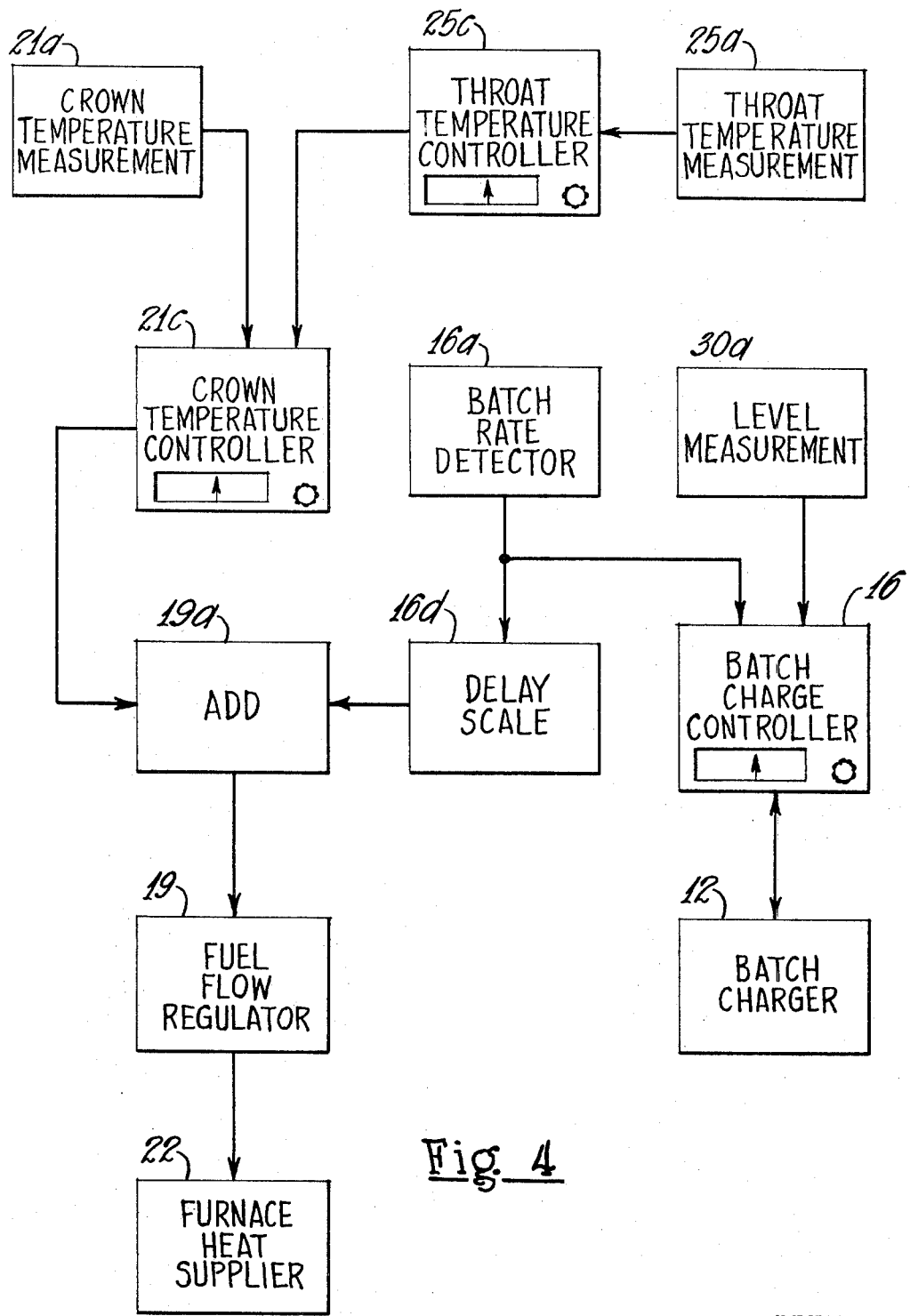
FIG. 4 is a diagrammatic layout of an alternative control for the system described herein.

Referring to FIG. 4 there is illustrated an alternate control schematic utilizing the components described hereinbefore. In FIG. 4 the furnace temperature controller 21d has been omitted. The output of the throat temperature controller 25c is used as an input to the crown temperature controller 21c to effect a modification of the setpoint therein or the output signal therefrom. The outputs of units 21c and 16d may advantageously be algebraically combined in an ADD unit 19a for providing an input to regulator 19.

The outputs of the throat temperature controller 25c; a crown temperature controller 21c, and the batch charge controller may also be combined directly in the fuel flow regulator means 19.

The throat temperature controller signal may here be defined as the master signal and utilized as the controlling setpoint for furnace temperature operation. The crown temperature controller output (which also may be affected by an input received from the under glass measurement circuit 20a) is utilized to produce a signal which is proportional to actual furnace temperature conditions; whether the temperature is above glass, below glass or a combined indication.

The "anticipating" signal, as derived from the batch feed rate detector 16a or level control loop as discussed hereinbefore, is then applied to regulator 19 or an ADD unit 19a as a bias or modifying signal to preset heating conditions before the need for a change in heat requirements can be sensed.

There has thus been described and disclosed herein apparatus for continuously melting heat-softenable materials which comprises means for melting the material and retaining the molten material in a pool, and means withdrawing the material from the pool for use in a process. Means are used for feeding unmelted batch material to the melting means. Means provide heat to the melting means and the temperature in the melting means is sensed. Means responsive to the rate of feed of the batch material to the melting means and to the melting temperature sensing means is operative to regulate the amount of heat supplied to the melting means. The level of the molten pool is sensed and the batch feeding means is advantageously made responsive to the level sensing means to feed batch at a rate to maintain a predetermined pool level.

The novel apparatus herein is useful for carrying out a novel method for controlling the melting of heat-softenable material including the steps of melting the material in a furnace, retaining the molten material in a pool, withdrawing molten material from the pool for use in a process, feeding batch material for melting in the furnace, heating the furnace, sensing the temperature in the furnace, and regulating the amount of heat supplied to the furnace in response to the temperature sensed in the furnace and the rate of feeding batch to the furnace.

While I have shown certain particular embodiments of my invention, it will, of course, be understood that I do not wish to be limited thereto, since many modifications may be made and I contemplate by the disclosure herein to cover all such modifications as fall within the true spirit and scope of my invention.

I claim:

1. Apparatus for continuously melting heat-softenable material comprising means for melting said material, means withdrawing said material from said melting means for use in a process, means for feeding unmelted batch material to said melting means, means for detecting the rate of feed of said batch material to said melting means and generating a signal which is proportion to the anticipated amount of heat required to melt said unmelted batch material, means for supplying heat energy to said melting means, and means responsive to the signal from said means for detecting rate of feed of said batch material to said melting means for regulating the amount of heat supplied to said melting means.

2. Apparatus for producing fibers from heat-softenable material comprising means for melting said material, feeder means for receiving molten material from said melting means having at least one orifice formerd therein for issuing a stream of molten material, means for attenuating said stream into a fiber, means for feeding batch material to said melting means, means for detecting the rate of feed of said batch material to said melting means and generating a batch feed rate signal which is proportional to the anticipated amount of heat required to melt said batch material, means for supplying heat energy to said melting means, means for sensing temperature in said melting means and generating a signal proportional thereto, and means responsive to said batch feed rate signal and to said melting means temperature signal for regulating the amount of heat supplied to said melting means to melt said material and maintain said molten material at a desired temperature.

3. Apparatus as defined in claim 2 in which said melting means comprises a furnace and in which said melting temperature sensing means comprises means for sensing the crown temperature of said furnace.

4. Apparatus as defined in claim 2 which further includes means for sensing the temperature of molten material exiting from said melting means and generating a signal proportional to the material flow through the apparatus, said heat regulating means being further responsive to said exit temperature signal to check material flow through the apparatus and further modify the amount of heat supplied to said melting means.

5. Apparatus as defined in claim 2 in which said melting temperature sensing means comprises means for sensing the temperature of molten material in said melting means.

6. Apparatus as defined in claim 5 in which said melting temperature sensing means further includes sensing the temperature of said melting means above said molten material.

7. Apparatus for producing glass fibers comprising a furnace for melting glass batch to form a molten pool of glass, feeder means for receiving molten glass from said pool and issuing at least one stream of molten glass from an orifice formed therein, means for attenuating said stream into a fiber, burner means for supplying heat in said furnace, means for sensing actual temperature in said furnace and generating a signal proportional thereto, means for generating a setpoint signal proportional to a desired operating temperature for said furnace, means for comparing said actual and setpoint temperature signals and regulating fuel flow to said burner means in response to a difference in said signals, means for feeding glass batch to said furnace, means for sensing the rate of feed of batch to said furnace and generating a signal proportional thereto as a measure of anticipated heat requirements for said furnace, and means for combining said batch rate feed signal with said actual and setpoint temperature signals to further regulate fuel flow to said burner means.

8. Apparatus as defined in claim 7 in which said actual temperature sensing means includes means for sensing the crown temperature of said furnace.

9. Apparatus as defined in claim 7 in which said actual temperature sensing means includes means for sensing the temperature of said molten pool in said furnace.

10. Apparatus as defined in claim 7 which further includes means for sensing the temperature of molten glass exiting from said molten pool to said feeder means and generating a signal proportional to glass flow past said exit temperature sensor, and means for combining said exit temperature signal as a measure of glass flow through said furnace with said actual and setpoint temperature signals and said batch feed rate signal to regulate fuel flow to said burner means.

11. Apparatus as defined in claim 7 which further includes means for sensing the level of said molten pool and generating a signal in response to different levels to control said batch feeding means and means for deriving said batch feed rate signal from said level sensing signal as a measure of anticipated heat requirement.

12. Apparatus as defined in claim 11 which further includes means for detecting the approach of an operating limit for at least one of the variables being monitored and modifying the responses of the variables to prevent the operating limit from being passed.

13. Apparatus as defined in claim 12 which includes means for modifying the batch feed rate in response to detection of an approach to an operating limit of a variable being monitored.

14. Apparatus as defined in claim 7 in which said combining means includes means for delaying said batch feed rate signal a predetermined time to match said rate signal to an actual change in batch material fed to said furnace.

15. Apparatus as defined in claim 7 in which said combining means includes means for scaling said batch feed rate signal to match said rate signal to an actual change in batch material fed to said furnace.

16. A method for continuously melting heat-softenable material comprising the steps of feeding batch material to a furnace for melting, heating said furnace to melt said material, therein withdrawing molten material from said furnace for use in a process, detecting the rate of feed of said batch material to said furnace, and regulating the amount of heat supplied to said furnace in response to the detected rate of feeding batch to said furnace in anticipation of the amount of heat required to melt said material and maintain the molten material at a desired temperature.

17. A method for producing glass fibers comprising feeding glass batch to a furnace for melting into a pool, flowing molten glass from said pool into feeder means for issuing at least one molten stream of glass therefrom, attenuating said stream into a fiber, regulating heat energy flow to said furnace in response to deviations of actual furnace temperatures from a desired setpoint temperature, and monitoring the rate of batch feed to said furnace and modifying the amount of heat supplied to said furnace by said regulating step in response to monitored changes in said batch feed rate.

18. A method as defined in claim 17 which further includes the steps of sensing the temperature of molten glass exiting from said pool and utilizing the temperature of said exiting molten glass as a check on the rate of flow of glass through the system to further modify the amount of heat supplied to said furnace by said regulating step in accordance with glass flow rates through the system.

19. A method as defined in claim 17 which further includes the step of monitoring the level of said pool to derive a signal from pool levels which is indicative of glass flow rates through said furnace, and utilizing the pool level signal to further modify the amount of heat supplied to said furnace by said regulating step.

20. A method as defined in claim 17 which further includes the steps of monitoring a plurality of temperatures throughout the melting furnace-feeder system and modifying the amount of heat applied to the monitored portions in response to sensed changes in temperature to obtain a desired throughput of glass through the system, detecting the approach of a temperature toward a preselected operating limit, and modifying the rate of feed of glass batch material to the system to prevent an operating limit from being exceeded.

References Cited

UNITED STATES PATENTS

| | | | |
|---|---|---|---|
| 3,420,510 | 1/1969 | Griem | 65—162X |
| 3,476,538 | 11/1969 | Trethewey | 65—29 |
| 3,482,956 | 12/1969 | Trethewey | 65—162X |

S. LEON BASHORE, Primary Examiner

R. L. LINDSAY, Jr., Assistant Examiner

U.S. Cl. X.R.

65—11, 29, 135, 136, 162